United States Patent
Mootz

(10) Patent No.: US 8,420,976 B2
(45) Date of Patent: Apr. 16, 2013

(54) LASER WELDER

(75) Inventor: Andreas Mootz, Tettnang (DE)

(73) Assignee: EMAG Holding GmbH, Salach (DE)

( * ) Notice: Subject to any disclaimer, the term of this patent is extended or adjusted under 35 U.S.C. 154(b) by 413 days.

(21) Appl. No.: 12/907,151

(22) Filed: Oct. 19, 2010

(65) Prior Publication Data

US 2011/0089148 A1 Apr. 21, 2011

(30) Foreign Application Priority Data

Oct. 20, 2009 (DE) .................. 10 2009 049 892

(51) Int. Cl.
*B23K 26/00* (2006.01)
*B23K 37/00* (2006.01)

(52) U.S. Cl.
USPC .................................. 219/121.63; 228/44.3

(58) Field of Classification Search ............... 219/121.6, 219/121.63, 121.64, 101–107; 228/4.1, 5.1, 228/5.7, 6.1, 44.3, 44.5
See application file for complete search history.

(56) References Cited

U.S. PATENT DOCUMENTS

| | | | | |
|---|---|---|---|---|
| 4,626,651 A | * | 12/1986 | Taniguchi et al. | 219/121.63 |
| 4,672,165 A | * | 6/1987 | Ishii et al. | 219/97 |
| 5,713,506 A | * | 2/1998 | Erikson et al. | 228/44.3 |
| 6,335,508 B1 | * | 1/2002 | Nam | 219/121.67 |
| 6,803,538 B2 | * | 10/2004 | Wright et al. | 219/121.63 |

FOREIGN PATENT DOCUMENTS

DE 19947588 A 7/2001

* cited by examiner

*Primary Examiner* — Sang Paik
(74) *Attorney, Agent, or Firm* — Andrew Wilford

(57) ABSTRACT

An apparatus for fitting two first workpieces with respective second workpieces of different dimensions has a track extending longitudinally through an assembly station and a welding station. An assembling appliance in the assembly station has a pair of jigs each dimensioned to fit with a respective one of the second workpieces, and a holdown appliance in the welding station similarly has a pair of differently sized holddowns. The holddown appliance can move between a pair of positions in each of which a respective one of the holddowns is aligned under the welding head. A workpiece holder in which either of the first workpieces can be held is shiftable between positions in the assembly station under the assembling appliances and a position in the welding station underneath a stationary welding head therein.

9 Claims, 4 Drawing Sheets

LASER WELDER

FIELD OF THE INVENTION

The present invention relates to laser welder. More particularly this invention concerns an apparatus for fitting together and then welding together two workpieces.

BACKGROUND OF THE INVENTION

The standard procedure for making a multipart workpiece, for instance a wheel hub, is to first fit a base or first workpiece with a second workpiece. For instance a cylindrical base workpiece can be fitted with a ring. To this end the base workpiece is mounted in a holder and the ring is fitted to a jig. The holder presses the base workpiece up against the ring to fit them together, then the fitted-together parts are shifted to a welding station where they are rotated under a welding head that joins them along a circular seam.

Such an apparatus is described in DE 199 47 588 A1. Specified as different laser machining processes are material removal, material deposition, hardening and welding. The holding device can be moved under digital control in at least two axis running transverse to one another and, by means of a pressing process, can bring two workpieces into a defined position relative to one another for laser welding. The holding device is configured as a workpiece spindle rotatable about an axis. Further, a laser beam head is provided which can be pivoted about two axes. For joining a flange shaft and a bell-shaped workpiece, a chuck adapted to the workpiece geometry and an annular holddown or jig are provided in the holding means.

While this system works well, whenever workpiece size changes, it is necessary to shut down the entire machine and change the holddowns and jigs. This can represent a significant loss of production.

OBJECT OF THE INVENTION

It is the object of the present invention to provide a flexible laser welder to optimize use with workpieces of different dimensions.

SUMMARY OF THE INVENTION

These objects are attained in an apparatus for fitting two first workpieces with respective second workpieces of different dimensions. The apparatus has a track extending longitudinally through an assembly station and a welding station, a stationary laser-welding head in the welding station, an assembling appliance in the assembly station having a pair of jigs each dimensioned to fit with a respective one of the second workpieces, and a holddown appliance in the welding station having a pair of holddowns each dimensioned to fit with a respective one of the second workpieces. This holddown appliance is shiftable between a pair of positions in each of which a respective one of the holddowns is aligned under the welding head. A workpiece holder in which either of the first workpieces can be held is shiftable between positions in the assembly station under the assembling appliances and a position in the welding station underneath the welding head. The holder is also movable for pressing the first workpiece it is holding against and fitting it with one of the second workpieces in the respective jig and for thereafter moving the fitted together first and second workpieces into position under the welding head and moving them to weld them together along a seam.

An advantageous aspect of the invention is to have the appropriate assembling means available in the assembling position for machining different workpieces and also to provide a holddown adapted to the workpiece geometry in the welding station. Thereby, retrofitting of the machine can be automated. Moreover, changeover times between workpieces of different dimensions are significantly reduced. Because the workpiece holder moves the workpiece to the respective position, the operating personnel does no longer need to intervene. In an advantageous embodiment, the holddowns necessary for fixing the components are arranged in a magazine. If a holddown needs to be changed in the welding station, the magazine is moved on guide rails thereby positioning the desired holddown. In a further advantageous embodiment, the moveable workpiece holder can be coupled to the magazine. Thereby, the magazine does not need its own drive.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
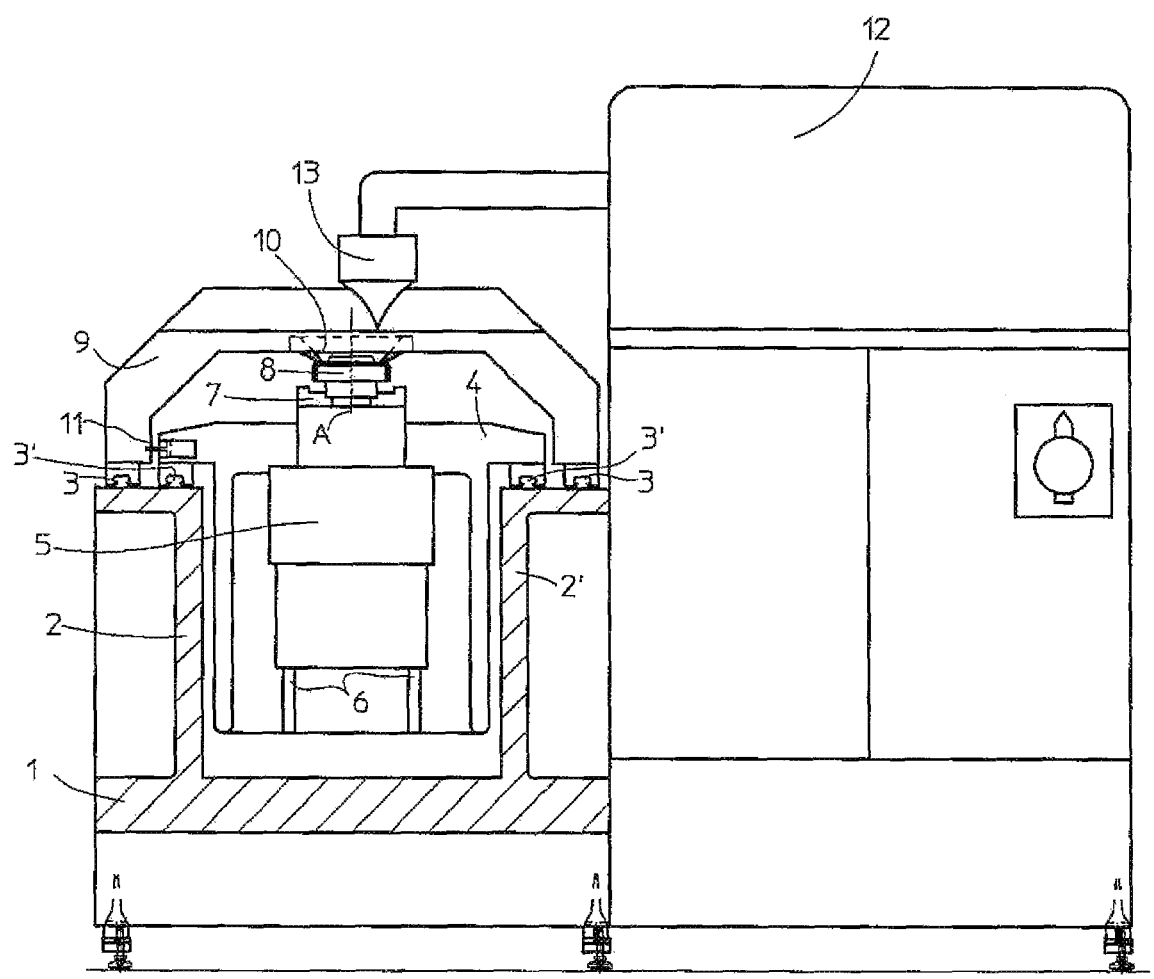
FIG. 1 shows the laser welder in a front view.

As seen in FIG. 1, a base frame 1 has two longitudinally extending and vertical walls 2 and 2' spaced transversely from each other. Horizontal and longitudinally extending inner guide rails 3' for a slide 4 sit atop the walls 2 and 2'. An actuator shown schematically at 19 can shift the slide 4 longitudinally. The slide 4 is provided with a workpiece holder 5 configured as a spindle vertically shiftable on guides 6 below the rails 3'. The motor spindle extends along and is centered on a vertical axis A and carries at its upper end a chuck 7 that holds a first workpiece 8. Above the slide 4, a downwardly U-shaped magazine 9 carries longitudinally spaced identical holddowns 10 and 10'. The magazine 9 can be moved on outer guide rails 3 also in the longitudinal and horizontal direction. The slide 4 can be connected via a coupling 11 to the magazine 9 and can push it into the desired position. Thus, the magazine 9 does not need its own drive. A laser source or generator 12 is provided on the right side in FIG. 1. A downwardly directed laser head 13 connected to it is stationary.

Figure 2:
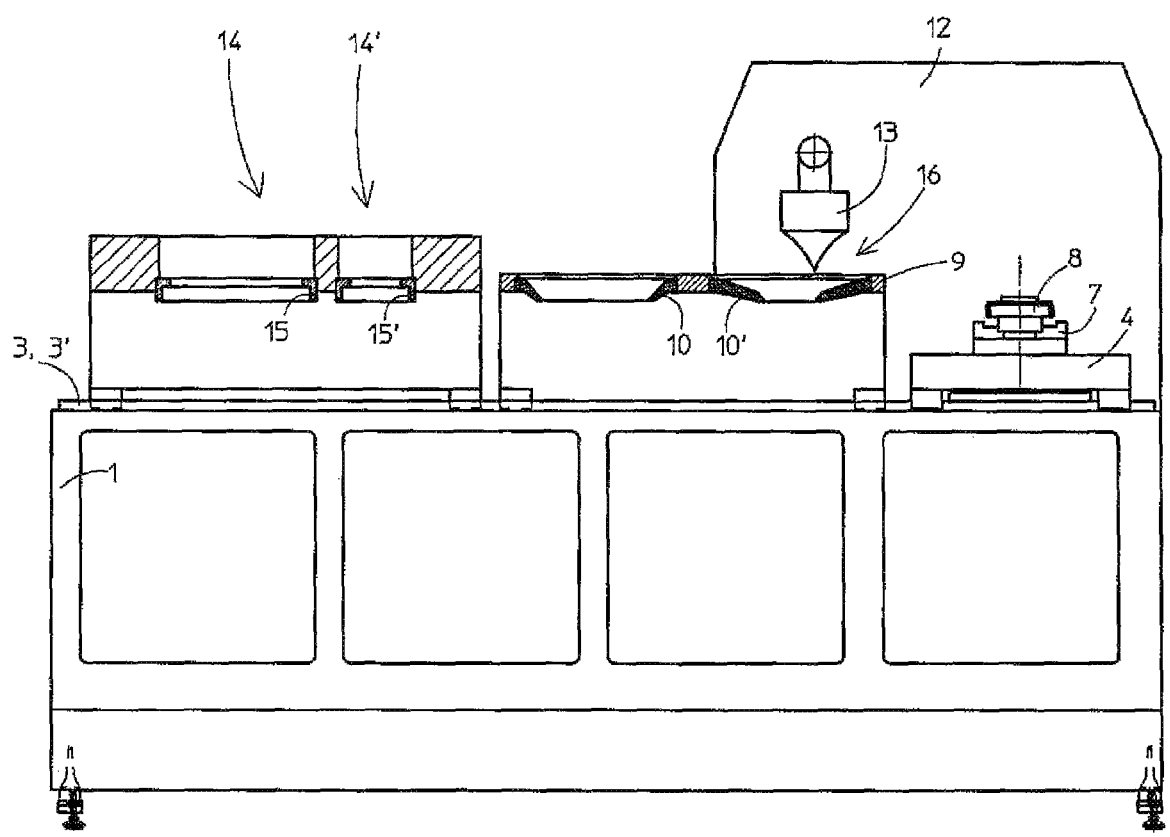
FIG. 2 shows the laser welder in a side view.

In the embodiment shown in FIG. 2, a laser welder for workpieces with two different diameters is illustrated in side view. The welder can be used for machining of workpieces of different shapes and/or dimensions. A small first or base workpiece 8 is fitted to the chuck 7, and the slide 4 transports it into an assembly station 14'. There, the workpiece holder 5 moves upward and presses the workpiece 8 and a second workpiece or part 17 against a jig 15' which corresponds to the workpiece dimensions. This action fits the part 17 down against the workpiece 8. After this, the workpiece holder 5 is lowered again and the slide 4 moves to a welding station 16. There, the workpiece holder 5 is moved upward and presses the workpieces 8 and 17 against the holddown 10'. The motor spindle then rotates the workpiece 8 underneath the laser head 13, and a weld seam 18 is created joining the workpieces 8 and 17 together.

Figure 3:
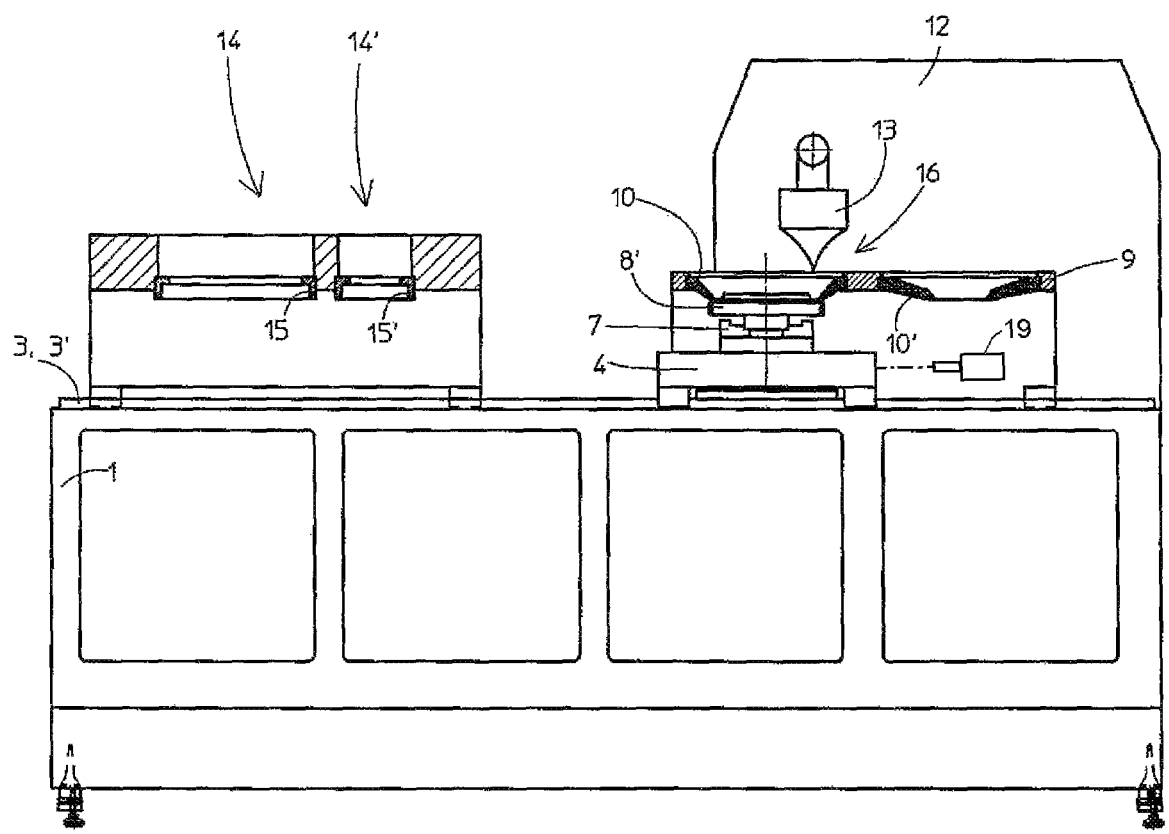
FIG. 3 shows the laser welder according to FIG. 2 when machining of a large workpiece.

Like FIG. 2, FIG. 3 shows the machining of a first workpiece 8' with a larger diameter. For this purpose, the magazine 9, which has been connected to the slide 4 via the coupling 11, has been moved so the holddown 10 is in the welding station 16. Prior to this the workpiece holder 5 has pressed the bigger workpiece 8' up against the jig 15 to fit it with a larger second workpiece.

Figure 4:
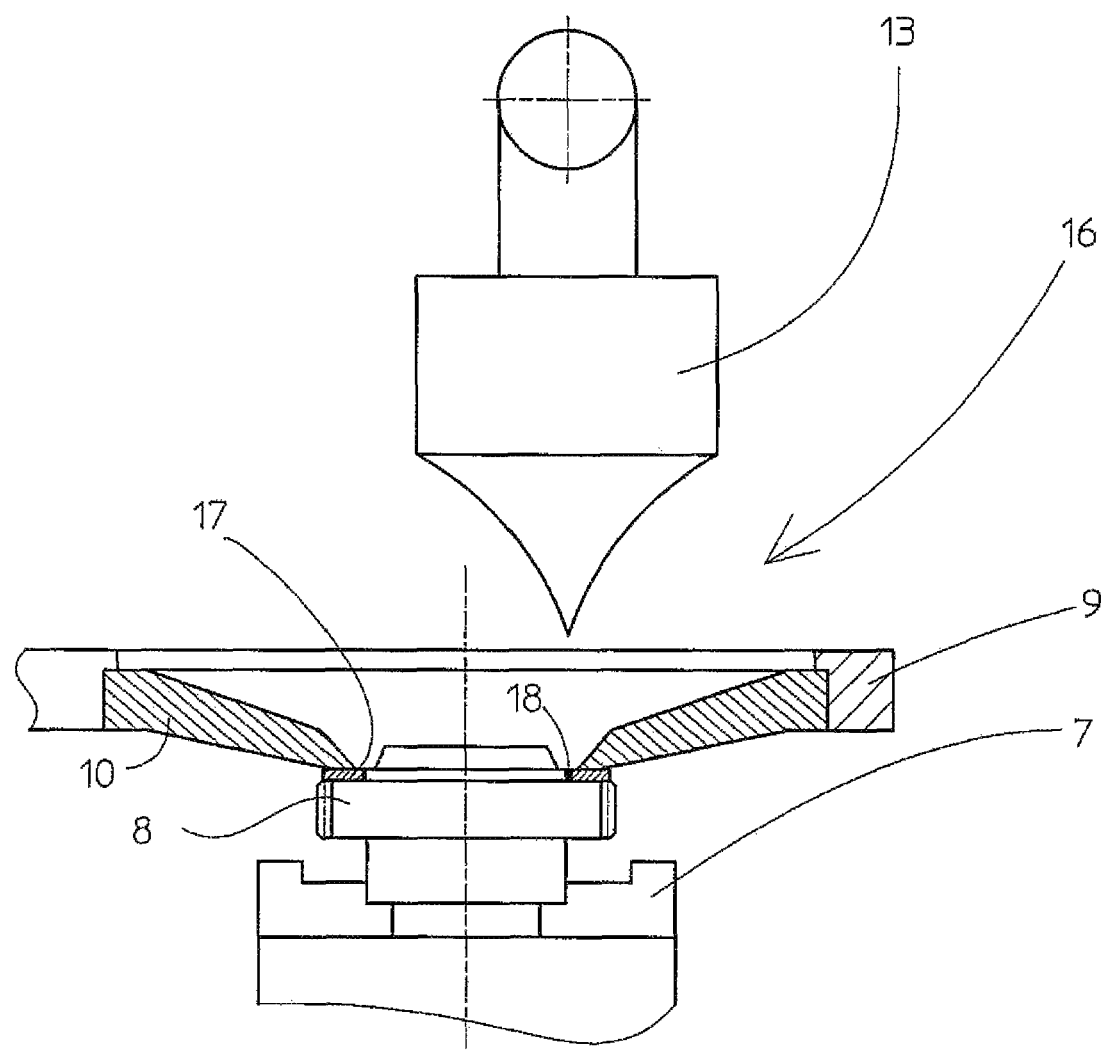
FIG. 4 shows the welding station in an enlarged view.

For clarification purposes, FIG. 4 shows the welding station in an enlarged view. The part 17, which had previously been pressed in the assembly station 14' onto the workpiece 8 held in the chuck 7, is in the welding station 16. The motor spindle moves upward and pushes the workpiece 8 against the holddown 10. By exposure to laser radiation from the laser head 13, the weld seam 18 is formed.

Thus, with this laser welder, automated retrofitting without moving the laser head is possible.

I claim:

1. An apparatus for fitting two first workpieces with respective second workpieces of different dimensions, the apparatus comprising:
   a track extending longitudinally through an assembly station and a welding station;
   a stationary laser-welding head in the welding station;
   an assembling appliance in the assembly station having a pair of jigs each dimensioned to fit with a respective one of the second workpieces;
   a holddown appliance in the welding station having a pair of holddowns each dimensioned to fit with a respective one of the second workpieces, the holddown appliance being shiftable between a pair of positions in each of which a respective one of the holddowns is aligned under the welding head;
   a workpiece holder in which either of the first workpieces can be held; and
   actuator means for shifting the holder between positions in the assembly station under the assembling appliance and a position in the welding station underneath the welding head, the holder being shiftable for pressing the first workpiece it is holding against and assembling it with one of the second workpieces in the respective jig and for thereafter moving the fitted together first and second workpieces into position under the welding head and moving them against one of the holddowns while welding them together along a seam.

2. The laser-welding apparatus defined in claim 1 wherein the holder is shiftable along the track.

3. The laser-welding apparatus defined in claim 2 wherein the holddown appliance is a carriage shiftable along the track.

4. The laser-welding apparatus defined in claim 2, further comprising
   a coupling engageable between the holddown appliance and the holder for joint displacement with the holder.

5. The laser-welding apparatus defined in claim 2 wherein the track includes at least one pair of horizontal and longitudinally extending rails extending through the stations.

6. The laser-welding apparatus defined in claim 3 wherein the holder is vertically displaceable.

7. The laser-welding apparatus defined in claim 6 wherein the holder is movable underneath the assembly appliance.

8. The laser-welding apparatus defined in claim 6 wherein the workpiece is movable underneath the holddown appliance.

9. The laser-welding apparatus defined in claim 6 wherein the holder can rotate the workpiece about a vertical axis.

* * * * *